(No Model.) 2 Sheets—Sheet 2.
J. S. DETWILER.
APPARATUS FOR AGITATING AND BLENDING POWDERED MATERIALS.
No. 525,138. Patented Aug. 28, 1894.
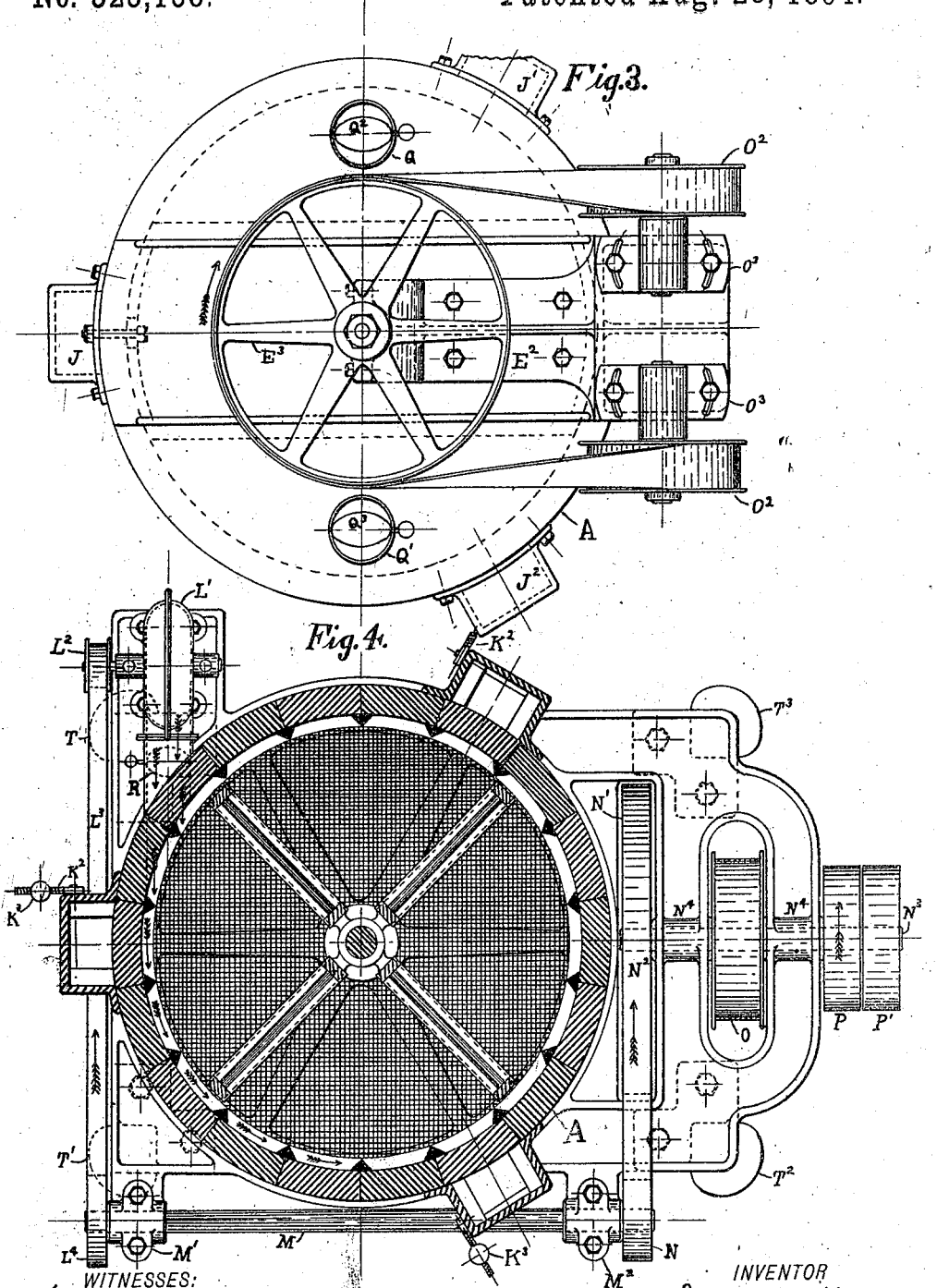

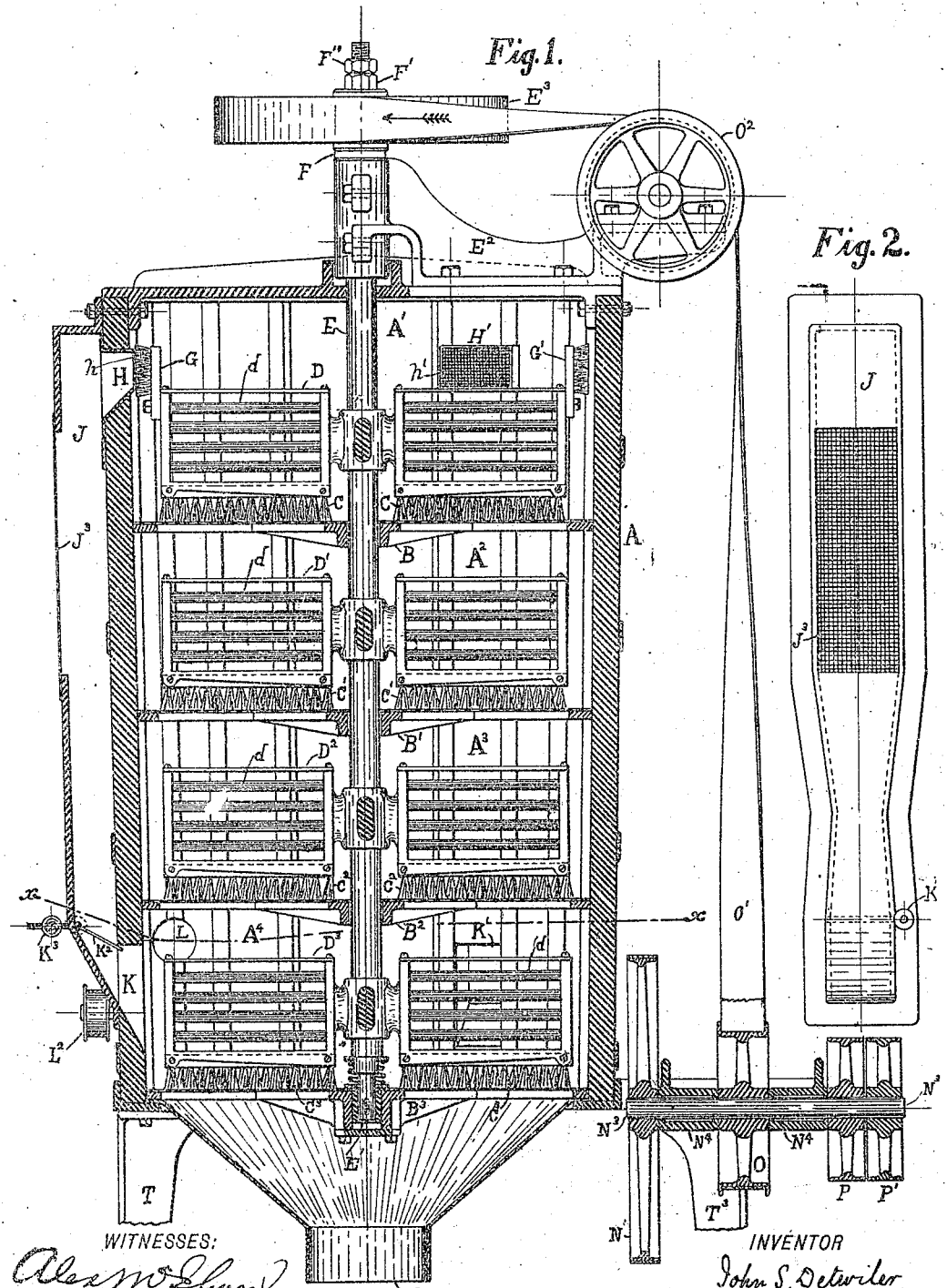

UNITED STATES PATENT OFFICE.

JOHN S. DETWILER, OF PHILADELPHIA, PENNSYLVANIA, ASSIGNOR TO WILLIAM P. LOGAN, OF SAME PLACE.

APPARATUS FOR AGITATING AND BLENDING POWDERED MATERIALS.

SPECIFICATION forming part of Letters Patent No. 525,138, dated August 28, 1894.

Application filed March 25, 1893. Serial No. 467,612. (No model.)

*To all whom it may concern:*

Be it known that I, JOHN S. DETWILER, a citizen of the United States, residing at the city of Philadelphia, in the county of Philadelphia and State of Pennsylvania, have invented certain new and useful Improvements in Apparatus for Agitating and Blending Powdered Materials, of which the following is a specification.

My invention has relation to apparatus for breaking up, reducing, freeing from moisture and blending together different pulverized or powdered substances or materials.

It is a well known fact in the manufacture of flour or powdered substances in general, that a certain amount of heat is generated in the reduction of the same to a powdered state and that such heat generated causes the sugar and gummy constituents of the grain or analogous materials, to become pasty or adhesive, so that when the powdered grain is conducted from the reducing roll or millstones, such sticky constituents in the reduced grain to a greater or less degree readheres, thereby causing fermentation and the more or less pulverized and lumpy particles of the reduced grain to sour. Another defect in the practiced methods of milling arises from allowance of a large percentage of moisture to remain in the ground and bolted grain, which causes as a consequence fermentation and ultimate souring, thereby rendering the flour or equivalent substance unfit for subsequent use.

The principal objects of my invention are first, to overcome the above mentioned disadvantageous features and various defects arising in the treatment of grain or the like to adapt the same for use and to provide a comparatively simple, inexpensive and efficient apparatus for thoroughly breaking up, reducing, freeing moisture from and blending intimately together the infinitesimal particles of different pulverized or powdered substances or materials; and second, to provide an apparatus for subjecting the fresh ground and bolted grain to the influence of mechanical agitation to cause the thorough breaking up of the different more or less adhering or lumpy particles of the conglomerate mass and by the aid of air or gas by suspension of the particles, causing the intimate blending together of the different infinitesimal particles of the mass and during such agitation and air or gas suspension of the same, removing heat and moisture therefrom and collecting the intimately blended together or thoroughly commingled mass in bulk freed from noxious vapors, heat and moisture in a healthy or purified condition, and free also from any tendency to fermentation or subsequent souring thereof.

My invention consists of the improvements hereinafter described and claimed.

The nature and general features of my invention will be more fully understood from the following description taken in connection with the accompanying drawings illustrating an apparatus which has been found efficient for the practice of my invention; and in which—

Figure 1, is a vertical central section through an apparatus designed for the conduct of my invention. Fig. 2, is a front elevational view of one of the air separating chambers of the apparatus such as illustrated in Fig. 1. Fig. 3, is a top or plan view of the apparatus; and Fig. 4, is a horizontal section on the line $x$—$x$, of Fig. 1.

Referring to the drawings, A is a vertically disposed cylindrical drum or shell provided as illustrated in Fig. 1, with four internal chambers A', A², A³ and A⁴. The bottoms of the chambers are respectively provided with spider-frames B, B', B² and B³. The spider frame B, in the chamber A', is covered with moderately coarse meshed wire gauze, and the spider frame of each of the other chambers is covered with wire gauze $b$, $b'$, $b^2$ and $b^3$, but the mesh of each covering is of gradually increasing fineness. Traveling over each of these wire gauze bottoms, and in close contact therewith is a series of brushes designated in each chamber respectively by the letters C, C', C² and C³. These brushes are secured to arms or frames D, D', D² and D³, secured to a vertical shaft E, which is caused to rotate in the direction of the arrows as illustrated in Figs. 1 and 3, and having its bottom bearing E', in the center of the frame B³. This bearing E', is composed of anti-friction metal, and is self-lubricating, and covered in such a manner as that it is fully protected from dirt or other extraneous matter. The upper end of the shaft E, is mounted in a clamp bearing E², in order to permit of the free rotation thereof, as well as a slight vertical movement so as to cause the brushes C, C', C² and C³, to be brought simultaneously toward the respective gauze covered spider frames B, B' B² and B³, and to compensate for any wear of the brushes arising from continual use thereof. It will be observed that the shaft E, extends upward through the bearing E², and the hub of a pulley E³, which is mounted thereon and by a sliding key or feather is secured thereto. F, is a washer and F' and F², are jam-nuts. The washer F, is faced upon both surfaces, whereof one surface is in contact with the hub of the pulley, and whereof the other is in contact with the lower jam-nut F'. The jam-nuts F' and F², are threaded, and engage with a thread upon the shaft E, and by turning the same the shaft E, may be readily adjusted to insure the requisite bearing to the brushes C, C', C² and C³, to and against the gauze covered spider frames B, B', B² and B³. The respective brush frames D, D', D² and D³, have horizontal oblong openings therein for the free circulation of air or gas for purposes to be presently fully explained. The top brush frame D, supports to required position two vertically disposed brushes G and G', having their bristles projecting outward and in such manner as to travel across a series of openings H and H', located at suitable distances apart and provided in the wall or shell A, and covered with fine wire gauze h and h'. The brushes G and G', are adapted to sweep over the same in the rotation of the brush frames by the operation of the shaft E. The openings H and H', are in direct communication with a series of air or gas separating chambers J, J' and J², located on the outside surface of the drum or shell A as illustrated in Fig. 2, showing the front wall of one of these chambers partially covered with fine wire gauze J³. The other portions of the outer walls of the chambers J, J' and J², are solid and air tight. These chambers are narrow and long and extend from a point from nearly the top to the bottom of the shell or drum A, and in connection with the drum or shell A at K and K', at or near the bottom thereof. The openings K and K', are provided with automatic counter-balanced valves K², hinged in bearings in the surfaces of the chambers, one bearing extending outward far enough to carry a lever with a balancing weight K³, which is adjustably supported to said lever and in such manner as to maintain the valve tightly closed, when required.

In the lower chamber A⁴, is an opening L, inclined slightly in an upward direction and so as to cause an initial upward movement of air or gas, in the chamber A⁴, introduced from the blower L', having a direct communication with said chamber by means of a pipe connection, as illustrated in Fig. 4. The blower forces the air or gas into the chamber A⁴, in the direction indicated by the arrow in Fig. 4, when power is applied to the blower L', by means of a pulley L², having a band L³, surrounding a pulley L⁴, which is mounted on a shaft M, held in bearings M' and M², in the main frame of the apparatus. At the extremity of the shaft M, opposite the pulley L⁴, is a pulley N, having a band N², passing around the same and a pulley N'. The pulley N', is secured to the main driving shaft N³, which is supported in bearings N⁴. On the main driving shaft N³, is mounted a pulley O, for communicating motion by means of an endless belt O', to pulleys O², as illustrated in Fig. 3, and to the pulley E³, which is mounted on the shaft E. The pulleys O², are mounted upon a shaft located in swivel bearings O³, so that they may be free to turn and properly guide the belt O'. These bearings are held in position by bolts passing through slots, and are adapted to permit also of the proper adjustment thereof. Upon the driving shaft N³, are mounted loose and fast pulleys P and P', for actuating and stopping the machine when required.

The belt connections arranged in the manner hereinbefore explained are adapted to simultaneously rotate the shaft E, and the mechanism and brushes connected therewith and operating in unison with the same and likewise the blower L', for forcing air or gas into the chamber A⁴, for certain of the purposes of my invention.

The admission of materials to be treated is made at the top of the machine through the openings Q and Q', as illustrated in Fig. 3. These openings are provided with regulating valves Q² and Q³, to allow a given quantity of materials to enter continuously therethrough. As the proportion of the material to be treated must be regulated in proportion to the volume of air or gas presented thereto by the blower L', there is placed in the pipe L, which connects the blower with the chamber A⁴, a regulating valve R, adapted to control the required volume of air or gas in proportion to the materials undergoing treatment in the apparatus.

The material passing through the machine falls by gravity or is collected under the frame B³, in a funnel shaped discharge hopper S, which is connected with a suitable receptacle, and to enable a receptacle to be located beneath the machine, the same is mounted upon legs T, T', T² and T³, as illustrated for example, in Fig. 1.

The operation of the machine hereinbefore described, is as follows:—Power is applied to the driving shaft N³, to cause motion to be imparted to the moving parts of the machine, for example, the agitating brushes and blower. The valves in the three separating chambers J, J' and J², are closed by the weighted levers K³, connected with said valves K². The materials to be treated are admitted through the openings Q and Q', in small continuous streams or the like and fall upon the wire gauze covered spider frame or bottom B, of the chamber A', in a more or less lumpy or adhering together conglomerate mass, whereby means of the mechanical agitation permitted therein the different materials are broken up and reduced to infinitesimal particles and by the aid of air or gas in volume entering and rising floats and holds in suspension momentarily the said particles of the mass so as to cause the same to be thoroughly commingled or blended together and by their specific gravity as so blended together by means of the series of rotary brushes, the mass is forced through the meshes of the wire gauze of the bottom B, of the chamber A', and falling into the second chamber $A^2$, in a finely blended state meets with a column or volume of rising air or gas which holds the same momentarily in suspension and with the aid of the rotatable brush arms or frames D', is again thoroughly agitated in its commingled or blended state, freed from moisture and by means of the rotary brushes of the chamber $A^2$, it is forced through the wire gauze covered bottom B', thereof into the next chamber $A^3$, where the materials in a still more finely divided and blended state undergo practically the same treatment and are again forced by the series of rotary brushes $D^2$, into the chamber $A^3$, into the next chamber $A^4$, becoming finer and finer each time until finally the blended together mass by gravity falls into and through the hopper S, into a suitable receptacle in a highly purified, dry and perfectly blended together state or condition and entirely free from any tendency to fermentation or subsequent souring thereof. It may be here remarked that in each chamber the different commingled particles are more and more intimately blended together, until the mass in bulk is freed from the machine for use.

The air or gas when it first enters the chamber $A^4$, will endeavor to force its way in the direction of the path of least resistance, which is naturally through the sieve which forms the top of the chamber A', the bottom of said chamber $A^4$, having a finer mesh of wire gauze, accumulates more of the blended together materials than the chamber $A^3$. Consequently such arrangement constitutes a protection to the materials in undergoing treatment and prevents downward movement of the air or gas through the screen of the chamber $A^4$, communicating with the funnel shaped discharge hopper S, into and through which the thoroughly blended or commingled materials in bulk free from any agitating influences are discharged into a suitable receptacle. As the air or gas from the blower is forced upward, it retards the falling of the materials to a certain degree, proportionate to its force and the quantity of materials having a tendency to descend by gravity or otherwise. The air or gas is passed from chamber to chamber in an upward direction, through the different screens or sieves in the bottoms of the respective chambers of different degrees of fineness until it reaches the topmost chamber A', from whence it passes through the openings H and H', and carrying with it in suspension a certain quantity or proportion of the materials in a finely divided or comminuted state, and if the air or gas should be allowed to pass out without making proper provision for the removal of such comminuted or finely divided materials, the result would be a serious loss of matter undergoing treatment. This loss, however, is effectually prevented by allowing the air or gas and fine particles of the blended together materials to pass through the series of screened openings H and H', into the respective separating chambers J, J' and $J^2$. The materials tending to accumulate about the meshes of the wire gauze covered openings H and H', are removed from off the same by the rotary movement of the vertical brushes G and G', and such matter falls in a downward direction in said chambers. As the screens in the openings H and H', only partially remove the finely divided substances from the air or gas, the remainder must be caught and collected, and this is accomplished by permitting the air or gas and powdered materials to remain in a quiescent state in the separating chambers J, J' and $J^2$. The outer wall of each of these chambers is by preference partially covered with wire gauze and fine enough to prevent any of the dust or fine particles from passing through the same. The comminuted materials and air or gas remaining in these chambers in a quiescent state, under a slight pressure will separate by gravity and fall to the bottom of the respective separating chambers, resting upon the hinged valves K' and $K^2$, and when accumulating to a given weight, the valves will be automatically opened and the comminuted materials conveyed into the chamber $A^4$, to be there caused to commingle or blend with the materials therein, and passing from thence through the screen or sieve of the chamber $A^4$, into the funnel shaped discharge hopper S, and discharging therefrom into a suitable receptacle, for use.

It will be observed that the quantity of materials treated can be increased or decreased by the regulation of the air or gas supply as a large volume of air or gas will retard the progress of the materials through the machine, while a small quantity of air or gas will allow the same to pass through much more rapidly, but the quantity can readily be increased, which of course will not require so long a time to effect the required treatment thereof.

Having thus described the nature and objects of my invention, what I claim as new, and desire to secure by Letters Patent, is—

1. An apparatus for treating powdered materials, comprising a shell divided into a series of chambers with perforated bottoms, a rotatable shaft provided with slotted frames having brushes adapted to sweep over the perforations in said bottoms, outlets in the wall of one of said chambers leading to separating chambers having automatic valves connected therewith, an air or gas inlet in the lower part of said shell, a blowing engine connected therewith, inlets connected with the top of said shell and provided with regulating valves, and means for actuating said shaft and blowing engine, substantially as and for the purposes set forth.

2. An apparatus for treating powdered materials, comprising a shell divided into a series of chambers having perforated bottoms and each provided with rotatable agitating and sweeping devices mounted on a vertical shaft, inlets and outlets in said shell, a discharge hopper in the bottom thereof, separating chambers connected at the top and bottom with said shell and provided with automatic valves, and means for actuating the moving parts of the machine, substantially as and for the purposes set forth.

3. An apparatus for treating powdered materials, comprising a shell divided into a series of chambers having spider frame bottoms respectively covered with wire gauze of different degrees of fineness, agitating and brushing devices mounted on an adjustable shaft, inlets in the top with regulating valves for the admission of materials into said shell, an air or gas blast in the lower part, an outlet hopper in the bottom, separating chambers arranged around the periphery of said shell and each connected therewith and provided with valves for automatically controlling the discharge of material in mass from said separating chambers into the lower part of the shell, and means for actuating said shaft and controlling said air or gas blast, substantially as and for the purposes set forth.

In testimony whereof I have hereunto subscribed my name, in the presence of two witnesses, at Philadelphia, on this 21st day of March, 1893.

JOHN S. DETWILER.

Witnesses:
GEO. W. REED,
CHAS. C. COLLIER.